United States Patent [19]
Sill et al.

[11] Patent Number: 5,794,960
[45] Date of Patent: Aug. 18, 1998

[54] CHASSIS WITH CONVERTIBLE GOOSENECK

[75] Inventors: Gerald A. Sill, Edgerton; Gary L. Fenton, Stoughton, both of Wis.

[73] Assignee: Stoughton Trailers, Inc., Stoughton, Wis.

[21] Appl. No.: 604,822

[22] Filed: Feb. 23, 1996

[51] Int. Cl.⁶ ............................................. B62D 53/06
[52] U.S. Cl. ........................... 280/441.2; 280/425.2; 280/DIG. 8; 410/77; 410/80
[58] Field of Search .................. 280/441.2, 425.2, 280/DIG. 8, 656; 410/77, 80, 90

[56] References Cited

U.S. PATENT DOCUMENTS

| | | | |
|---|---|---|---|
| 3,034,825 | 5/1962 | Harlander et al. | 296/35 |
| 3,083,852 | 4/1963 | Lidstrom | 214/515 |
| 3,085,707 | 4/1963 | Tantlinger | 220/1.5 |
| 3,587,890 | 6/1971 | Hyland et al. | 214/152 |
| 3,721,199 | 3/1973 | Hassenauer | 410/77 |
| 3,752,502 | 8/1973 | Ehler | 280/440 |
| 3,861,716 | 1/1975 | Baxter et al. | 280/423 R |
| 4,089,539 | 5/1978 | Berger | 410/80 |
| 4,092,050 | 5/1978 | Sobeck | 298/18 |
| 4,119,328 | 10/1978 | Rhodes | 280/415 |
| 4,561,671 | 12/1985 | DeWitt et al. | 280/404 |
| 4,566,714 | 1/1986 | DeWitt et al. | 280/404 |
| 4,580,805 | 4/1986 | Bertolini | 280/405 |
| 4,754,709 | 7/1988 | Gramse et al. | 105/355 |
| 4,854,791 | 8/1989 | Brown | 410/52 |
| 4,922,832 | 5/1990 | Lienard et al. | 105/4.2 |
| 4,952,118 | 8/1990 | Macmillan | 414/788.2 |
| 4,955,144 | 9/1990 | Lienard et al. | 105/4.2 |
| 5,017,066 | 5/1991 | Tylisz et al. | 410/121 |
| 5,145,307 | 9/1992 | Smethwick et al. | 414/458 |
| 5,183,371 | 2/1993 | O'Daniel | 414/477 |
| 5,193,836 | 3/1993 | Hastings | 280/418.1 |
| 5,209,540 | 5/1993 | Metler | 296/3 |
| 5,398,956 | 3/1995 | Yurgevich | 280/441.2 |
| 5,456,485 | 10/1995 | Yargevich | 285/441.2 |

Primary Examiner—Christopher P. Ellis
Attorney, Agent, or Firm—Michael Best & Friedrich LLP

[57] ABSTRACT

The invention provides an improved chassis for hauling shipping containers over the road. The chassis includes a gooseneck portion having a support surface for engaging the tunnel section of a container. The support surface is manually adjustable and can be raised or lowered to change the effective height of the gooseneck portion so that the chassis is useable with containers having different tunnel depths. In particular, the gooseneck includes a pair of conversion rails that are pivotable to present alternative tunnel support surfaces. Stop members are also provided to secure the conversion rails in desired positions.

10 Claims, 5 Drawing Sheets

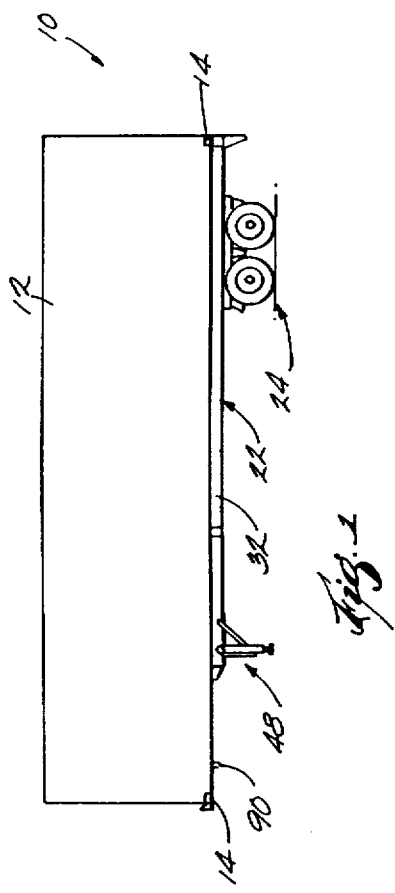
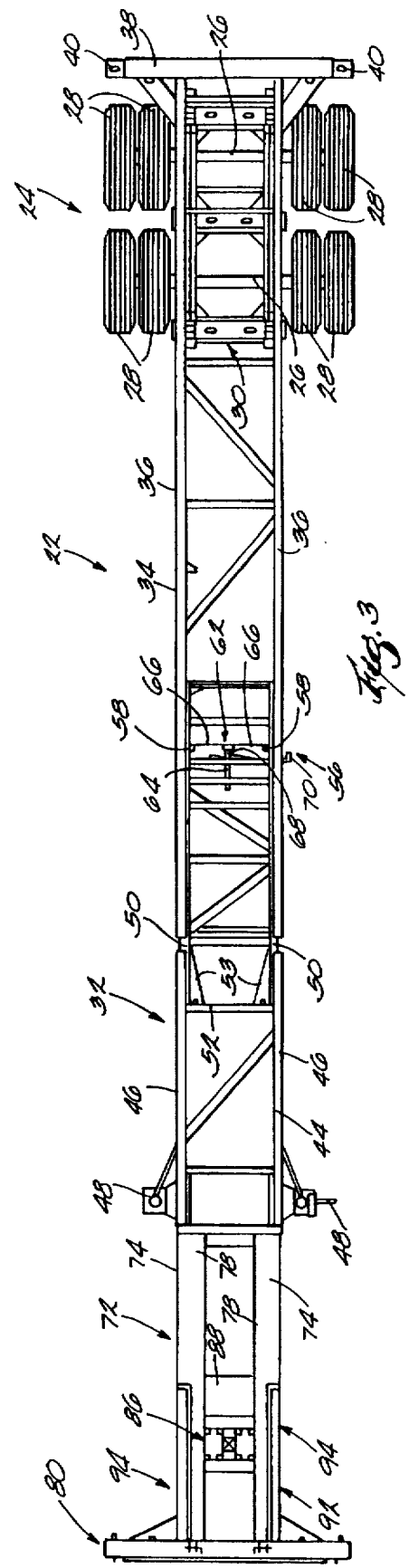

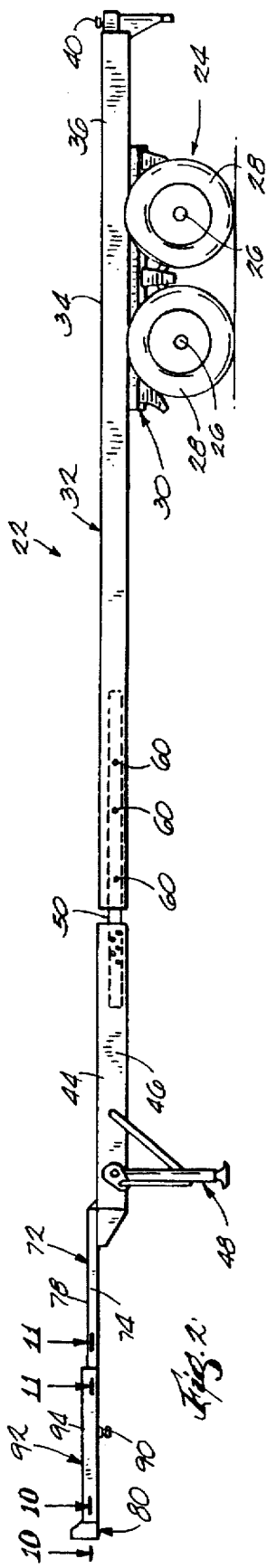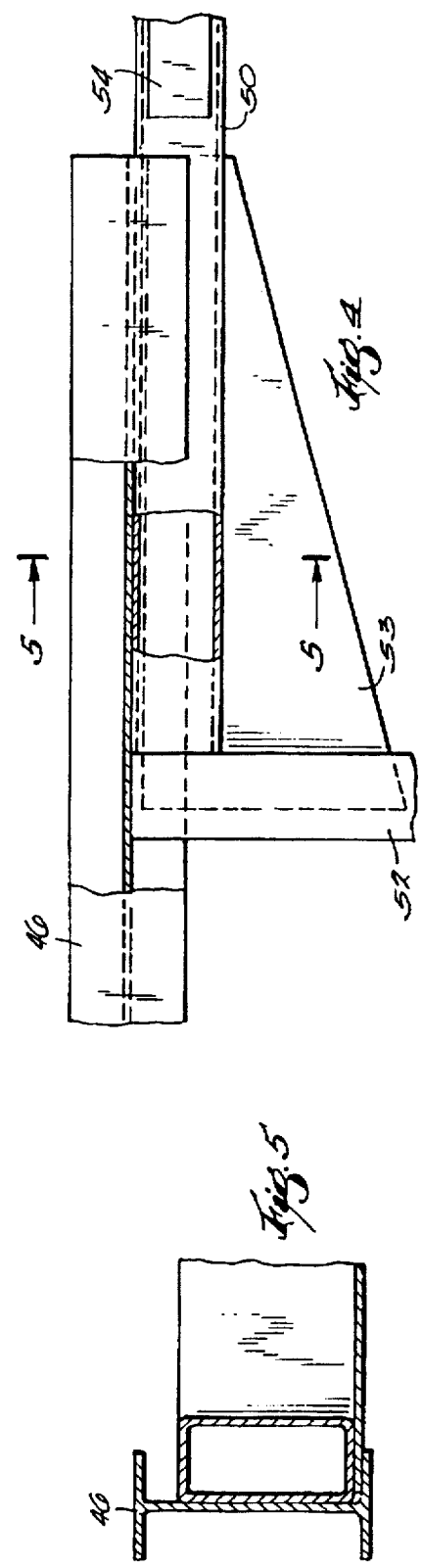

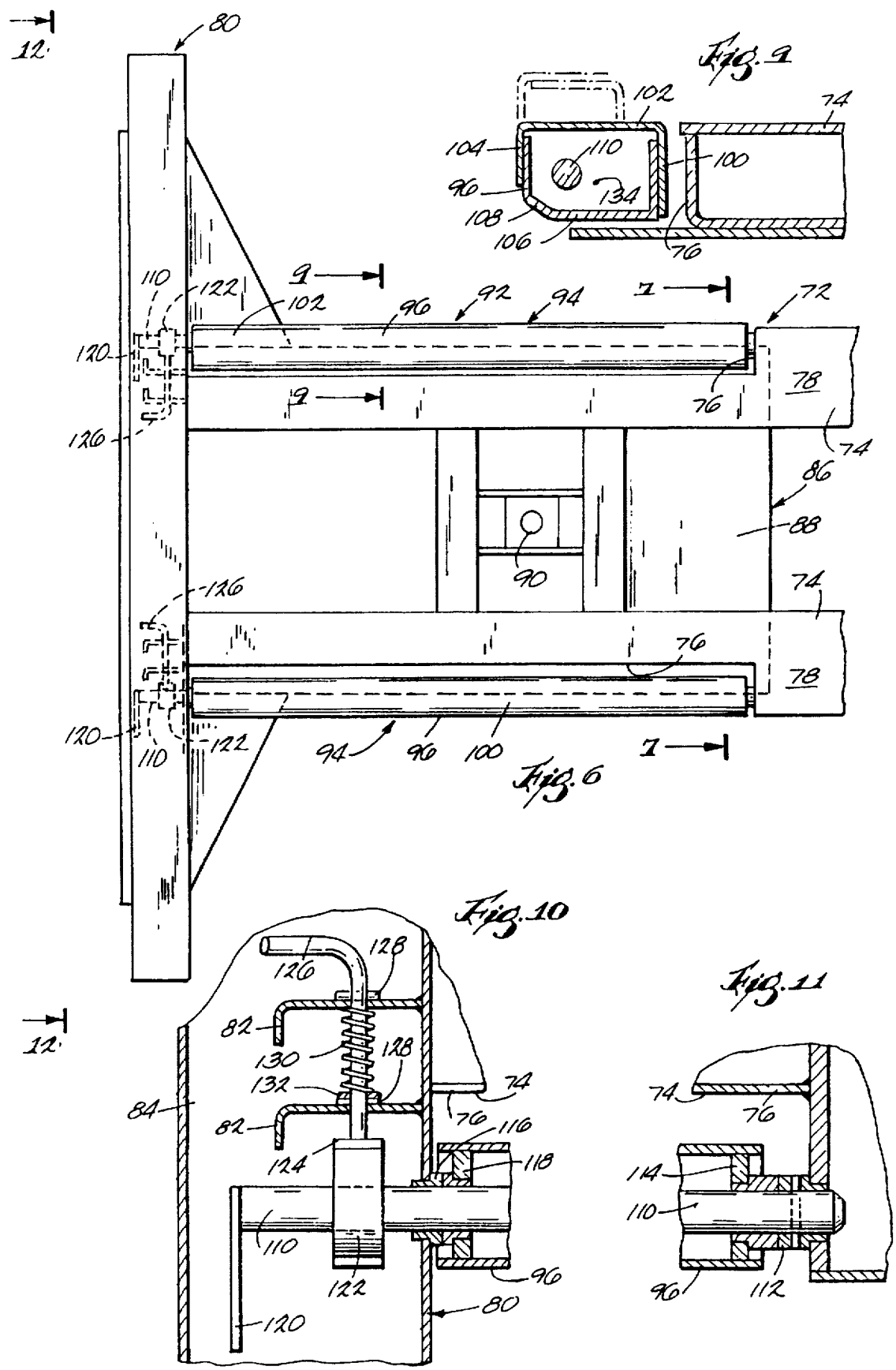

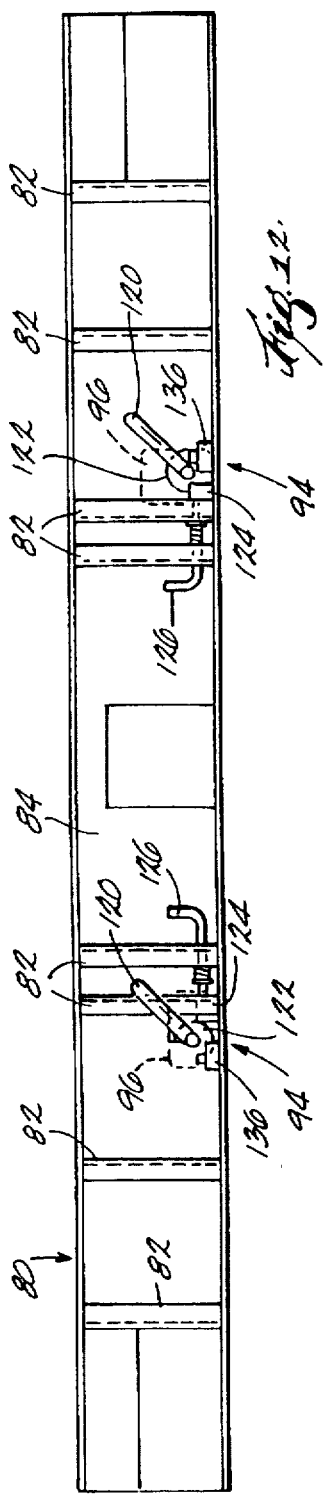
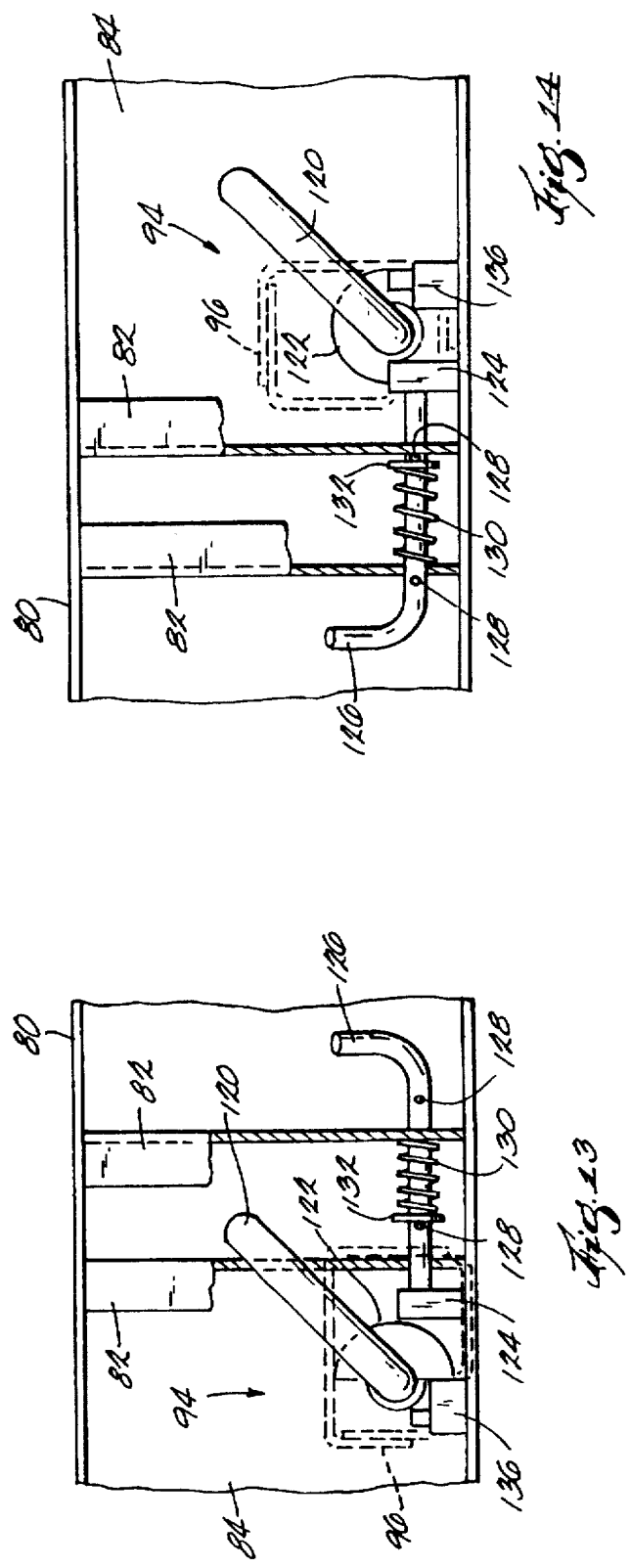

CHASSIS WITH CONVERTIBLE GOOSENECK

BACKGROUND OF THE INVENTION

1. Field of the Invention

The invention relates generally to chassis used to haul shipping containers over the road, and more particularly to chassis that are adjustable to accommodate containers of various sizes.

2. Reference to Prior Art

Shipping containers, such as ISO and domestic intermodal shipping containers for example, come in number of sizes and configurations. To match the variety of containers available, chassis used to haul those containers over the road also come in various sizes. Requiring a separate chassis for each container size results in high equipment costs related to the considerable number of chassis that may be required to service a large fleet of variously sized containers.

Also, chassis sometimes experience periods of down time. For example, when containers are off-loaded from chassis onto an outgoing ship or rail car they may sit idle until appropriately sized containers are available for transport from an incoming ship or rail car. To decrease costs associated with operating a fleet of containers, it is desirable to have on hand only as many chassis as are needed for the available containers.

To increase versatility and decrease down time it is known to construct container chassis that are longitudinally extendable to accommodate containers having different lengths. For example, U.S. Pat. No. 4,561,671 illustrates a chassis including a fifth wheel assembly connected to a real wheel assembly by an extendable stinger. The stinger fits in telescoping relation within channels of the fifth and rear wheel assemblies. Examples of other longitudinally extendable chassis are illustrated in U.S. Pat. Nos. 4,566,714 and 4,580,805.

In addition to variations in length, container dimensions are also variable in other respects. For example, many containers are provided with tunnel sections in their bottom walls that are adapted to receive a gooseneck portion of a chassis. The gooseneck fits into the tunnel section to assist in supporting the container in place on the chassis. Depending upon the inside dimensions of a container and its floor thickness tunnel depths can vary. For example, a standard container has a tunnel depth of about 4¾ inches while a "High-Cube" container has a shallower tunnel depth of about 3¼ inches. Accordingly, chassis having different gooseneck heights are required for hauling standard and High-Cube containers and those chassis are not interchangeable.

SUMMARY OF THE INVENTION

The invention provides an improved chassis that is useable to support shipping containers for over-the-road transport and that is adjustable to accommodate containers having various tunnel depths. In particular, in a preferred embodiment of the invention the gooseneck portion of the chassis is readily manually adjustable to raise and lower an engagement or support surface on which the tunnel rests (i.e., to change the effective height of the gooseneck portion). By providing a mechanism for raising and lowering the support surface containers with various tunnel depths can be transported with a common chassis, thereby eliminating the need for multiple chassis and increasing the versatility of the chassis.

More particularly, in one embodiment a chassis for use in transporting shipping containers over the road is provided with a gooseneck portion adapted to be received in the tunnel section of a container. The gooseneck portion includes a conversion rail apparatus having a pair of conversion rails that are adjustable to provide alternative support surfaces for engaging the tunnel section of the container. In a preferred embodiment, the alternative support surfaces of the conversion rails are accessed by pivoting a pair of rails about the axes of respective pivot shafts for supporting those rails. The outer surface configurations of the rails and the positions of the pivot shafts with respect to the rails are selected to present support surfaces having desired heights relative to the rest of the gooseneck portion. To facilitate pivoting of the rails, the shafts are provided with manually operable handles.

The conversion apparatus is also provided with a mechanism for inhibiting or preventing movement of the conversion rails from desired positions. In one embodiment, that mechanism includes stop blocks that can be engaged and disengaged to selectively prevent and permit shifting movement of the shafts (and the conversion rails). The eccentricity of the pivot shafts with respect to the centers of gravity of the longitudinal cross-sections of the rails can also be employed to restrict pivotal movement of the shafts.

In one embodiment the invention also provides a convertible chassis for hauling shipping containers having tunnel sections of varying depths. The chassis includes a wheel assembly, a frame supported on the wheel assembly, and a conversion apparatus supported on the frame. The conversion apparatus includes an engagement surface that is engageable with the tunnel section of a shipping container. The conversion apparatus also includes means for adjusting the height of the engagement surface with respect to the frame to accommodate shipping containers with varying tunnel section depths.

The invention further provides a chassis including a wheel assembly, a frame supported on the wheel assembly, and a rail supported on the frame. The rail includes an engagement surface, that is engageable with the tunnel section of a shipping container to support the shipping container on the frame. The rail is movable relative to the frame between a raised position wherein at least a portion of the engagement surface is at a raised height with respect to the frame and a lowered position wherein at least a portion of the engagement surface is at a lowered height with respect to the raised height so that the frame can accommodate shipping containers having varying tunnel depths.

The invention further provides a convertible chassis including a wheel assembly and a frame. The frame includes a rear section supported on the wheel assembly and a front section extending from the rear section. The front section includes a king pin assembly for connecting the chassis to a towing vehicle. The chassis is also provided with a conversion apparatus including a pair of spaced apart rails positioned above the king pin assembly on the front section of the frame. The rails are receivable in the tunnel section of a shipping container to support the shipping container on the front section of the frame, and each of the rails provides an engagement surface engageable with the tunnel section of the shipping container. Each of the rails is also shiftable between a first position wherein the engagement surface thereof is at a first height with respect to the rear section of the frame, and a second position wherein that engagement surface is at a raised height with respect to the first height.

Other features and advantage of the invention will become apparent to those skilled in the art upon review of the following detailed description, claims and drawings.

BRIEF DESCRIPTION OF THE DRAWINGS

FIG. 1 is a side elevational view of a container-chassis combination including a shipping container mounted on a convertible chassis embodying features of the invention.

FIG. 2 is an enlarged side elevational view of the chassis illustrated in FIG. 1.

FIG. 3 is a top plan view of the chassis illustrated in FIG. 2 but shown with the slider assembly moved to a rearward position with respect to its position in FIG. 2.

FIG. 4 is an enlarged view, partially cutaway and in section, of a portion of the chassis illustrated in FIG. 3.

FIG. 5 is a view taken along the line 5—5 in FIG. 4.

FIG. 6 is an enlarged view of the front part of the chassis illustrated in FIG. 3, and shown with a roadside conversion rail in a first position and a curbside conversion rail in a second position.

FIG. 9 is an enlarged cross-sectional view taken along line 9—9 in FIG. 6.

FIG. 10 is an enlarged cross-sectional view taken along line 10—10 in FIG. 2.

FIG. 11 is an enlarged cross-sectional view taken along line 11—11 in FIG. 2.

FIG. 12 is a view taken along line 12—12 in FIG. 6, but with the conversion rails in alternative positions.

FIG. 13 is an enlarged and partially cut away view of the front section of a portion of the chassis illustrated in FIG. 12 and including the curbside conversion rail.

FIG. 14 is a view similar to FIG. 13 but shows the portion of the front section including the roadside conversion rail.

Figure 8:
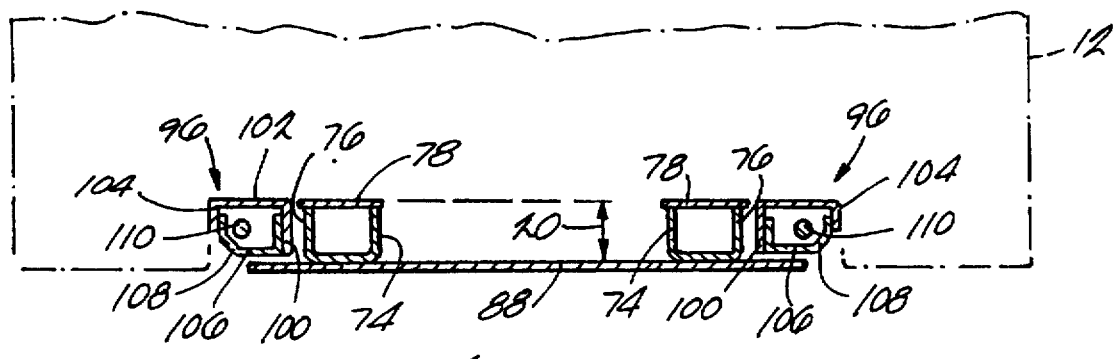
FIG. 8 is a view similar to FIG. 7 and shows both conversion rails adjusted to a second position to accommodate a container having a shallower tunnel depth.

Before one embodiment of the invention is explained in detail, it is to be understood that the invention is not limited in its application to the details of construction and the arrangements of components set forth in the following description or illustrated in the drawings. The invention is capable of other embodiments and of being practiced or carried out in various ways. Also, it is to be understood that the phraseology and terminology used herein is for the purpose of description and should not be regarded as limiting.

DESCRIPTION OF A PREFERRED EMBODIMENT

Illustrated in FIG. 1 is a container-chassis combination 10 including a removable shipping container 12. While the container 12 can have a variety of sizes and configurations as is understood by those skilled in the art, in the particular embodiment illustrated in the drawings the container 12 is a standard size and includes conventional lock-receiving fittings 14 at its four lower corners (only two of which are shown).

The container 12 also includes a recessed tunnel section 16 (shown schematically in FIGS. 7 and 8) in its bottom wall that extends rearwardly from the front of the container 12. In the arrangement illustrated in FIG. 7 the tunnel section 16 has a standard depth (i.e., about 4¾ inches) indicated by reference numeral 18. In other arrangements, the tunnel section 16 can be provided with other depths. For example, in the arrangement shown in FIG. 8 tunnel depth is indicated by reference 20 and is preferably about 3¼ inches which corresponds to the tunnel depth of a High-Cube container.

The container-chassis combination 10 also includes a chassis 22 on which the container 12 is mountable for movement over the road and which embodies features of the invention. As shown in FIGS. 2 and 3, the chassis 22 includes a rear wheel assembly 24 which in the illustrated arrangement includes tandem axles 26 and wheels 28 supported on the axles 26. The rear wheel assembly 24 also includes a suspension system 30 which in the illustrated arrangement includes a standard slider assembly that is shown in different positions in FIGS. 2 and 3. If desired, the suspension system 30 could also be fixed in place.

The chassis 22 also includes a longitudinally elongated frame 32 on which the container 12 is supportable. The frame 32 includes a rear frame section 34 mounted on the rear wheel assembly 24. The rear frame section 34 includes a pair of laterally spaced apart rear frame rails 36 which in the illustrated arrangement are generally I-shaped. The rear frame section 34 also includes a rear bolster 38 fixed to the rear ends of the frame rails 36 by suitable means such as welding and support members. The opposite ends of the rear bolster 38 are provided with (FIGS. 2 and 3) lock members 40 that are receivable in the lock-receiving fittings 14 at the rear end of the container 12 to lock the container 12 in place on the frame 32. An example of a suitable lock member 40 is illustrated in U.S. Pat. No. 4,626,155.

The frame 32 also includes a front frame section 44. The front frame section 44 includes a pair of laterally spaced apart front frame rails 46 which in the illustrated arrangement (see FIG. 5) are generally I-shaped. To support the frame 32 in a generally horizontal position when not connected to a towing vehicle (not shown), landing gear 48 is mounted on the front frame rails 46.

To accommodate containers having various lengths, the frame 32 is provided with means for interconnecting the rear and front frame sections 34 and 44 to permit adjustment of the length of the frame 32. In the illustrated arrangement, the means for interconnecting the rear and front frame sections 34 and 44 includes a pair of tubular slider rails 50. In the illustrated arrangement the slider rails 50 form part of the front frame section 44 and are (see FIG. 5) fixed to the insides of front frame rails 46 via suitable means such as weldment, (see FIG. 4) a crossmember 52, and gusset members 53. The slider rails 50 are also received in telescoping relation on the rear frame rails 36 and are slidable relative thereto to permit movement of the front frame section 44 relative to the rear frame section 34. To facilitate this sliding movement, the slider rails 50 are preferably provided with slide pads 54 (partially shown in FIG. 4) on the upper and lower surfaces thereof.

Means are also provided for locking the slide rails 50 against movement relative to the rear frame section 34 to secure the frame 32 at a desired length. While various means for locking the slide rails 50 can be employed, in the illustrated arrangement such means includes (FIG. 3) a spring-loaded locking mechanism 56. The locking mechanism 56 includes a pair of locking pins 58 that are supported on the slider rails 50 and that are spring biased outwardly for engagement with holes 60 provided in the rear frame rails 36. The locking mechanism 56 also includes a linkage 62 to retract the pins 58. The linkage 62 includes a pivot shaft 64 supported between the slide rails 50 and a pair of arms 66 connected to the pivot shaft 64 at diametrically opposite locations eccentric to the axis of the shaft 64. A torsion spring 68 is provided on the pivot shaft 64 to bias the locking pins 58 toward their outward positions. To rotate the pivot shaft 64 and thereby retract the locking pins 58, a manually operable lever arm 70 is provided.

Figure 7:
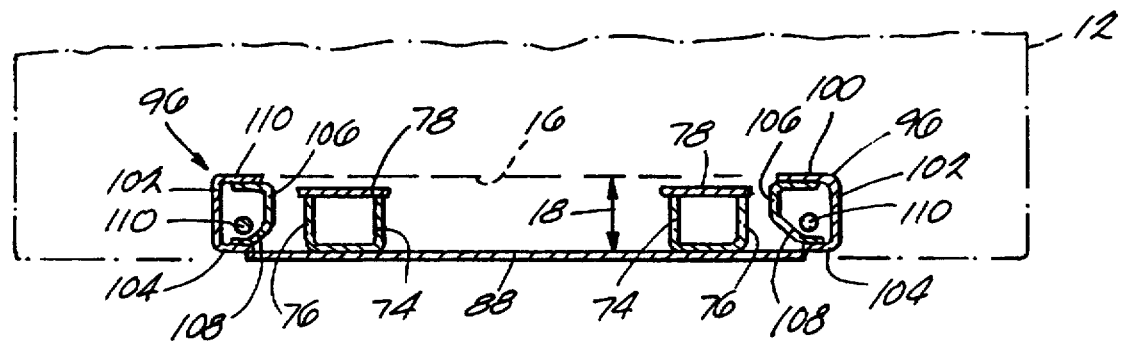
FIG. 7 is a partial cross-sectional view taken along line 7—7 in FIG. 6 and showing both conversion rails adjusted to a first position to accommodate a container (shown schematically) having a specified tunnel depth.

As shown in FIGS. 2 and 3, the front frame section 44 also includes a gooseneck portion 72 that is raised relative to the rest of the frame 32 and that is receivable in the tunnel section 16 of a container (see FIGS. 7 and 8). The gooseneck portion 72 includes a pair of laterally spaced apart gooseneck rails 74 that extend forwardly from the front frame rails 46 and that are provided with cutout or notch portions 76. Each of the gooseneck rails 74 includes an upper support surface 78 which in the illustrated arrangement is adapted to engage the tunnel section 16 of certain containers, as is further explained below.

The gooseneck portion 72 also includes a laterally extending front bolster 80 connected to the front ends of the gooseneck rails 74. As shown in FIG. 12, the front bolster 80 includes a plurality of L-shaped gusset members 82 and defines an interior area 84 which in the illustrated arrangement can be accessed from the front of the frame 32.

To attach the chassis 22 to a towing vehicle, the gooseneck portion 72 is also provided with a king pin assembly 86. The king pin assembly 86 includes a pick-up plate 88 that is fixed to the undersides of the gooseneck rails 74 and that extends forwardly to form a portion of the front bolster 80. The king pin assembly 86 also includes a king pin 90 for hooking the chassis 22 to the towing vehicle in a manner known to those skilled in the art.

The gooseneck portion 72 also includes a conversion apparatus 92 for changing the effective height of the gooseneck portion 72 to accommodate containers having different tunnel depths, such as tunnel depths 18 and 20. As shown in FIG. 6, the conversion apparatus 92 includes a support or engagement surface for engaging the tunnel section 16 of the container 12 and means for adjusting the height of the engagement surface relative to the support surfaces 78 of the gooseneck rails 78 (and the rest of the frame 32). In the arrangement illustrated in the drawings the means for adjusting the height of the engagement surface includes a pair of laterally spaced apart conversion rail assemblies 94.

As shown in FIGS. 6-9, each of the conversion rail assemblies 94 includes a tubular conversion rail 96 which in FIG. 6 are shown in different positions for illustrative purposes. The conversion rails 96 are assembled from separate rail sections (see FIG. 9) that have been welded together, and each of the conversion rails 96 includes an outer surface. The rails 96 could also be a unitary tubular or solid member. Those outer surfaces of the conversion rails 96 combine to form the engagement surface for engaging the tunnel section 16. In the particular arrangement illustrated in the drawings (see FIGS. 7-9), the outer surface of each of the conversion rails 96 has portions 100 and 102 that are alternatively engageable with the tunnel section 16, as is further explained below. For reasons that are also explained below, each of the outer surfaces also includes surface portions 104 and 106 and a surface portion 108.

Each of the conversion rail assemblies 94 also includes a pivot shaft 110 for supporting the conversion rail 96. Each of the pivot shafts 110 is positioned in the notch portion 76 of one of the gooseneck rails 74 and is mounted for pivotal movement relative thereto. In particular, each of the pivot shafts 110 is mounted at its rear end on one of the gooseneck rails 74 via (FIG. 11) a bushing 112 and an end plate 114 and at its front end on the front bolster 80 via (FIG. 10) a bushing 116 and an end plate 118.

The conversion rails 96 are fixed on the pivot shafts 110 and are supported for pivotal movement therewith. In the illustrated arrangement the conversion rails 96 are each pivotable between a first position (shown in FIGS. 7 and 14) in which surface portion 100 is positioned at a first height with respect to the rest of the frame 32, and a second position (shown in FIGS. 8 and 13) in which surface portion 102 is at lowered height with respect to the first height. In the illustrated arrangement the first position and the second position are selected to accommodate tunnel depths 18 and 20, respectively, as is explained below.

Each of the conversion rail assemblies 94 also includes (see FIGS. 10 and 12-14) a handle 120 mounted on the front end of the pivot shaft 110 so that the conversion rail 96 can be selectively manually shifted to a desired one of its alternative first and second positions (i.e., to select between surface portion 100 and surface portion 102). The handles 120 are contained within the interior area 84 of the front bolster 80 for protective purposes.

Each of the conversion rail assemblies 94 also includes means for locking or securing the conversion rail 96 in a selected one of its positions. In the illustrated embodiment the means for securing the conversion rail 96 includes a semi-circular first stop block 122 mounted on the corresponding pivot shaft 110. The means for securing the conversion rail 96 also includes a second stop block 124 that is supported on the front bolster 80 for movement relative to the pivot shaft 110. In particular, the second stop block 124 is mounted on a locking pin 126 that is supported on a pair of the gusset members 82 for movement normal to the axis of the pivot shaft 110. As shown in FIGS. 10, 13 and 14, the locking pin 126 is provided with roll pins 128 to prevent removal of the locking pin 126 and to limit its range of movement with respect to the gusset members 82. The locking pin 126 is also provided with a spring member 130 and a washer 132 that serves as a seat for the spring member 130. The spring member 130 biases the second stop block 124 toward the first stop block 122 to maintain engagement therebetween, and the second stop block 124 is operable to prevent the conversion rail 96 from moving from its first position (FIG. 14) to its second position (FIG. 13). When the conversion rail 96 is in its second position (FIG. 13), the second stop block 124 is retracted and does not substantially prevent movement of the conversion rail 96.

While in the second position, the weight of the conversion rail 96 provides a mechanism to restrict its movement from that position. In particular, as shown in FIG. 9 each of the conversion rails 96 has a center of gravity (indicated with reference numeral 134) with respect to its lateral cross-section. The conversion rails 96 are mounted on the pivot shafts 110 at locations eccentric to their centers of gravity so that when the conversion rails 96 are in their second positions their weight tends to maintain them or bias them to stay in that position.

As shown in FIGS. 12-14, the aforementioned means for securing the conversion rail 96 can also be provided with a stationary third stop block 136 mounted on the front bolster 80. When the conversion rail 96 is in its first position (FIG. 14) the third stop block 136 is engaged by the first stop block 122. Thus, the second and third stop blocks 124 and 136 prevent the conversion rail 96 from being moved from that position. Similarly, as shown in FIG. 13, when the conversion rail 96 is in its second position the third stop block 136 is engaged by the first stop block 122, and the third stop block 136 and the weight of the conversion rail 96 prevent it from being moved from that position.

In operation, the conversion rails 96 can be manually shifted to adjust the effective height of the gooseneck portion 72 to accommodate containers having differing tunnel depths. In particular, in the embodiment illustrated in the drawings when the conversion rails 96 are positioned in their first positions (FIG. 7) the surface portions 100 are positioned at a height that is raised with respect to the surfaces 78 of the gooseneck rails 74 to accommodate a container having tunnel depth 18 (i.e. a standard tunnel depth). In that arrangement, the tunnel section 16 of a container is supportable on surface portions 100. When in their first positions, the conversion rails 96 are supported against movement by (see FIG. 14) engagement between the first and second stop members 122 and 124 and the first and third stop members 122 and 136.

To lower the effective height of the gooseneck portion 76, each conversion rail 96 is shifted from its first position (FIG. 7) to its second position (FIG. 8). For each conversion rail assembly 94 this is accomplished by first withdrawing the second stop member 124 from engagement with the first stop member 122 by pulling the corresponding locking pin 126. The handle 120 is then shifted inwardly (as seen in FIG. 12) to pivot the conversion rail 96 to its second position. As shown in FIG. 8, with the conversion rails 96 in their second positions surface portions 102 face upwardly and are positioned at a height to accommodate a container having tunnel depth 20 (i.e. a Hi-Cube container). At that height surface portions 102 are substantially coplanar with the support surfaces 78 of the gooseneck rails 74 to present an engagement surface that includes both the support surfaces 78 and the surface portions 102. The conversion rails 96 are thereafter maintained in their second positions by engagement between (see FIG. 13) the first and third stop members 122 and 136 and by their own weight.

To shift the conversion rails 96 back to their first positions the handles 120 are pivoted outwardly (as seen in FIG. 12). The second stop members 122 then move automatically to their engaged positions beneath the first stop members 120 under the influence of the springs 130.

It will be understood by those skilled in the art that the conversion rails 96 are intended to be shifted prior to placement of a container 12 on the chassis 22.

While in the illustrated arrangement only outer surface portions 100 and 102 of the conversion rails 96 function as engagement surfaces for supporting a tunnel section, in other embodiments the conversion rails 96 could be configured so that additional surface portions also could function as tunnel engagement surfaces. This would increase the number of different tunnel depths the chassis 22 is capable of accommodating.

Advantageously, the chassis 22 has increased versatility with respect to prior art chassis and is manually adjustable to provide more than one effective gooseneck height to accommodate containers having different tunnel depths. The length of the chassis 22 is also adjustable to accommodate containers of different lengths. Because it is useable with a variety of containers, the chassis 22 decreases both the number of chassis needed to service a fleet of containers and the downtime of those chassis.

We claim:

1. A convertible chassis for hauling shipping containers having tunnel sections of varying depths, the chassis comprising:

a wheel assembly, a frame supported on the wheel assembly, said frame including a pivot shaft pivotally mounted on the frame, a first stop member mounted on the shaft for pivotal movement with the shaft, and a second stop member mounted on the frame for movement relative to the pivot shaft, the second stop member being engageable with the first stop member to restrict pivotal movement of the pivot shaft, and a conversion apparatus supported on the frame, the conversion apparatus including a rail, the rail having an engagement surface, the engagement surface being engageable with the tunnel section of a shipping container, the rail being moveable with the pivot shaft between a first position and a second position, the rail being selectively secured in one of the first and second positions by engagement between the first stop member and the second stop member.

2. A convertible chassis as set forth in claim 1 wherein the frame is elongated in a longitudinal direction, and wherein the frame is extendable in the longitudinal direction to support shipping containers of varying lengths.

3. A convertible chassis as set forth in claim 1 wherein a portion of the engagement surface is at a first height with respect to the frame when the rail is in the first position, and the portion of the engagement surface is at a second height with respect to the frame when the rail is in the second position.

4. A convertible chassis as set forth in claim 1, wherein the lateral cross-section of the rail includes a center of gravity, and wherein the shaft is positioned eccentrically with respect to the center of gravity.

5. A convertible chassis as set forth in claim 1 wherein the rail is biased toward the first position.

6. A chassis for hauling shipping containers having tunnel sections of varying depths, the chassis comprising:

a wheel assembly, a frame supported on the wheel assembly, a pivot shaft having opposite ends, the pivot shaft being pivotally mounted on the frame, a rail supported on the frame, the rail including an engagement surface, the engagement surface being engageable with the tunnel section of a shipping container to support the shipping container on the frame, and the rail being attached to the pivot shaft, and a handle mounted on an end of the pivot shaft to facilitate manual rotation of the rail between a raised position wherein at least a portion of the engagement surface is at a raised height with respect to the frame and a lowered position wherein at least a portion of the engagement surface is at a lowered height with respect to the raised height so that the frame can accommodate shipping containers having varying tunnel depths.

7. A chassis as set forth in claim 6 wherein the frame is elongated in a longitudinal direction, and wherein the frame is extendable in the longitudinal direction to support shipping containers of varying lengths.

8. A chassis as set forth in claim 6 wherein the chassis includes a first stop member mounted on the pivot shaft, and a second stop member supported on the frame for movement relative to the pivot shaft, the second stop member being engageable with the first stop member to restrict pivotal movement of the pivot shaft, and wherein the pivot shaft is positioned to bias the rail toward the lowered position.

9. A convertible chassis for hauling shipping containers having tunnel sections of varying depths, the chassis comprising:

a wheel assembly, a frame supported on the wheel assembly, and a conversion apparatus supported on the frame, the conversion apparatus including an engagement surface, the engagement surface being engageable with the tunnel section of a shipping container, and means for adjusting the height of the engagement surface with respect to the frame to accommodate shipping containers with multiple tunnel section depths, wherein the conversion apparatus includes a rail, the rail including a portion of the engagement surface, and the rail being supported on the frame for movement between a first position in which the portion of the engagement surface is at a first height with respect to the frame, and a second position in which the portion of the engagement surface is at a second height with respect to the frame, and wherein the conversion apparatus includes means for securing the rail in a selected one of the first and second positions, and wherein the means for securing the rail in a selected one of the first and second positions includes a first stop member mounted on the shaft, and a second stop member supported on the frame for movement relative to the shaft, the second stop member being engageable with the first stop member to restrict pivotal movement of the shaft.

10. A chassis for hauling shipping containers having tunnel sections of varying depths, the chassis comprising:

a wheel assembly, a frame supported on the wheel assembly, and a rail supported on the frame, the rail including an engagement surface, the engagement surface being engageable with the tunnel section of a shipping container to support the shipping container on the frame, and the rail being movable relative to the frame between a raised position wherein at least a portion of the engagement surface is at a raised height with respect to the frame and a lowered position wherein at least a portion of the engagement surface is at a lowered height with respect to the raised height so that the frame can accommodate shipping containers having varying tunnel depths, wherein the chassis includes a pivot shaft for supporting the rail on the frame for pivotal movement between the raised and lowered positions, and wherein the chassis includes a first stop member mounted on the pivot shaft, and a second stop member supported on the frame for movement relative to the pivot shaft, the second stop member being engageable with the first stop member to restrict pivotal movement of the pivot shaft, and wherein the pivot shaft is positioned to bias the rail toward the lowered position.

* * * * *